(12) United States Patent
Yu

(10) Patent No.: US 11,059,634 B2
(45) Date of Patent: Jul. 13, 2021

(54) ASSEMBLE AND DISASSEMBLE STRUCTURE FOR CONTAINER LINER AND LINER LOCKING DEVICE THEREOF

(71) Applicant: Chun-Ming Yu, Taoyuan (TW)

(72) Inventor: Chun-Ming Yu, Taoyuan (TW)

( * ) Notice: Subject to any disclaimer, the term of this patent is extended or adjusted under 35 U.S.C. 154(b) by 239 days.

(21) Appl. No.: 16/200,003

(22) Filed: Nov. 26, 2018

(65) Prior Publication Data

US 2020/0079556 A1 Mar. 12, 2020

(30) Foreign Application Priority Data

Sep. 7, 2018 (TW) ................................. 107131398

(51) Int. Cl.
*B65D 47/12* (2006.01)
*B65D 47/14* (2006.01)
*B65D 51/00* (2006.01)
*B65D 41/04* (2006.01)

(52) U.S. Cl.
CPC ......... *B65D 47/122* (2013.01); *B65D 47/142* (2013.01); *B65D 51/005* (2013.01); *B65D 41/04* (2013.01); *B65D 2255/20* (2013.01); *B65D 2547/066* (2013.01)

(58) Field of Classification Search
CPC .. B65D 47/122; B65D 47/142; B65D 51/005; B65D 2255/20; B65D 41/04; B65D 2547/066; B65D 50/043; B65D 50/045; B65D 50/046; B65D 41/3404; B65D 41/3409; A47J 41/0077; A47J 41/0061
USPC ....................................................... 215/341
See application file for complete search history.

(56) References Cited

U.S. PATENT DOCUMENTS

| | | | | | |
|---|---|---|---|---|---|
| 3,106,808 A | * | 10/1963 | Lawdham | .......... | B65D 41/3404 53/488 |
| 3,199,702 A | * | 8/1965 | Fischbach | .......... | B65D 41/3404 215/252 |
| 3,805,987 A | * | 4/1974 | Horvath | ............. | B65D 41/3404 215/252 |
| 3,830,393 A | * | 8/1974 | Schaefer | .............. | B65D 50/045 215/209 |
| 3,901,404 A | * | 8/1975 | Feldman | ............ | B65D 41/3404 215/256 |
| 4,219,116 A | * | 8/1980 | Borkan | ................ | B65D 50/045 206/1.5 |
| 4,401,227 A | * | 8/1983 | Pehr | ................... | B65D 41/3447 215/252 |
| 4,534,479 A | * | 8/1985 | Conti | ................. | B65D 41/3409 215/252 |
| 4,548,329 A | * | 10/1985 | Curry | ................ | B65D 41/3404 215/216 |
| 4,572,385 A | * | 2/1986 | Luker | ................. | B65D 50/046 215/216 |

(Continued)

*Primary Examiner* — Ernesto A Grano
(74) *Attorney, Agent, or Firm* — Muncy, Geissler, Olds & Lowe, P.C.

(57) ABSTRACT

An assemble and disassemble structure for container liner and liner locking device thereof, which provides a drinking container having a mineral liner that can be replaced through the assemble and disassemble structure. The assembly is provided with an outer cylindrical sleeve, the interior of which is a holding space. The outer circumference of the upper end of the outer cylindrical sleeve is a connecting end, and the mineral liner is inserted into the outer cylindrical sleeve. A connecting ring is provided with a clasping portion, and assembling the clasping portion to the outer cylindrical sleeve enables fixing the mineral liner in a stable position in the outer cylindrical sleeve. An elastic locking device locks the connecting ring at combining angular positions.

8 Claims, 11 Drawing Sheets

(56) References Cited

U.S. PATENT DOCUMENTS

| | | | | |
|---|---|---|---|---|
| 4,726,482 | A * | 2/1988 | Barriac | B65D 41/3428 |
| | | | | 215/252 |
| 4,730,731 | A * | 3/1988 | Allison | B65D 50/045 |
| | | | | 206/1.5 |
| RE32,879 | E * | 2/1989 | Wright | B65D 41/3428 |
| | | | | 215/252 |
| 4,852,770 | A * | 8/1989 | Sledge | B65D 47/0814 |
| | | | | 222/153.14 |
| 5,816,422 | A * | 10/1998 | Roig | B65D 55/022 |
| | | | | 215/209 |
| 6,000,568 | A * | 12/1999 | Verter | B65D 41/3404 |
| | | | | 215/252 |
| 6,085,766 | A * | 7/2000 | Geary | F16M 11/28 |
| | | | | 135/75 |
| 8,281,948 | B2 * | 10/2012 | Stanek | B65D 55/024 |
| | | | | 220/324 |
| 8,960,502 | B2 * | 2/2015 | Stehli, Jr. | B05B 11/047 |
| | | | | 222/386.5 |
| 10,836,559 | B2 * | 11/2020 | Agerton | B65D 41/0478 |
| 10,836,560 | B2 * | 11/2020 | Agerton | B65D 83/753 |
| 2006/0065132 | A1 * | 3/2006 | Jongen | B65D 83/0055 |
| | | | | 99/485 |
| 2006/0151630 | A1 * | 7/2006 | Joseph | B05B 7/2478 |
| | | | | 239/346 |
| 2006/0207960 | A1 * | 9/2006 | Bastero Lopez | B65D 55/022 |
| | | | | 215/331 |
| 2009/0084751 | A1 * | 4/2009 | Pucci | B65D 41/325 |
| | | | | 215/217 |
| 2009/0101644 | A1 * | 4/2009 | Maiwald | B65D 51/18 |
| | | | | 220/254.1 |

* cited by examiner

ASSEMBLE AND DISASSEMBLE STRUCTURE FOR CONTAINER LINER AND LINER LOCKING DEVICE THEREOF

BACKGROUND OF THE INVENTION

(a) Field of the Invention

An assemble and disassemble structure for container liner and liner locking device thereof, which provides a mineral liner that can be assembled and disassembled.

(b) Description of the Prior Art

Drinking containers, such as thermos bottles for maintaining the temperature of drinks, need to have a thermal insulation layer disposed between an inner liner and an outer casing. However, because acidic beverages have a dissolution effect on metal materials, thus, the majority of present container liners used to contain beverages are now manufactured from mineral material. But the mineral material adopted for the liner has hard and brittle qualities, and thus easily damaged when external force is exerted thereto.

SUMMARY OF THE INVENTION

The present invention provides an assemble and disassemble structure for container liner and liner locking device thereof, comprising a container provided with a mineral liner, with the structure enabling assembly and disassembly of the mineral liner, and the locking device is used to enable locking the liner assembly and replacement of the liner after unlocking, further achieving the main object of providing the present invention with eco-friendly effectiveness.

Another object of the present invention lies in the assembly of an outer cylindrical sleeve, the interior of which is provided with a holding space. The outer circumference of the upper end of the outer cylindrical sleeve is a connecting end. A cylinder body of the mineral liner is inserted within the holding space, and a shoulder portion of the cylinder body is provided with a base pressing portion. The upper end surface of a connecting ring is centrally provided with a through hole, and the upper inner circumference of the connecting ring is provided with a clasping portion directed towards the through hole. When the clasping portion on the connecting ring is assembled to the connecting end, the base pressing portion is thereby securely fixed, enabling stable positioning of the mineral liner within the outer cylindrical sleeve.

The third object of the present invention lies in providing the lower level of the connecting end with a neck portion, with an elastic clasp joined to the neck portion. The lower end of the inner circumference of the connecting ring is radial annular provided with a locking ring member that comprises a locking device, wherein the locking ring member of the connecting ring is subjected to clasping by the elastic clasp, further locking the mineral liner to prevent coming loose.

The fourth object of the present invention lies in providing a cap locking end directly on the upper end of the mineral liner, to form an in/out structure for drinking after passing through the connecting ring. The outer end of the cap locking end is sealed by a cap body.

The fifth object of the present invention lies in providing the upper end of the mineral liner with a plane tubular surface, and an insertion method is used to insert the plane tubular surface in the inner circumference of a cap locking portion provided on the connecting ring. The plane tubular surface enables simple manufacture thereof.

The sixth object of the present invention lies in the inner circumference of an annular pressing surface of the mineral liner directly forming an in/out opening that affords passage to the interior drink receiving space. The in/out opening forms an in/out passage for drinking through connection with the inner circumferential surface of the cap locking portion, which further simplifies the manufacturing procedure of the mineral liner.

The seventh object of the present invention lies in enabling the elastic clasp to be subjected to an external force to effect a release operation through an assembling clearance between the external connecting ring and the outer cylindrical sleeve. The clearance provides structural concealment of the elastic clasp.

To enable a further understanding of said objectives and the technological methods of the invention herein, a brief description of the drawings is provided below followed by a detailed description of the preferred embodiments.

DETAILED DESCRIPTION OF THE PREFERRED EMBODIMENTS

An assemble and disassemble structure for container liner and liner locking device thereof of the present invention provides a container for drinking beverages. In recent times, in order to provide a multifunctional drinking container that is safe to use, industrial designers have adopted liners made from mineral materials. And in order to enable replacement of the liner through an assemble and disassemble structure, the present invention is fitted with a locking device that provides an assemble and disassemble locking and release function.

Regarding the structure and operation embodiments of the present invention, please refer to the description of the diagrams as follows.

Figure 1:
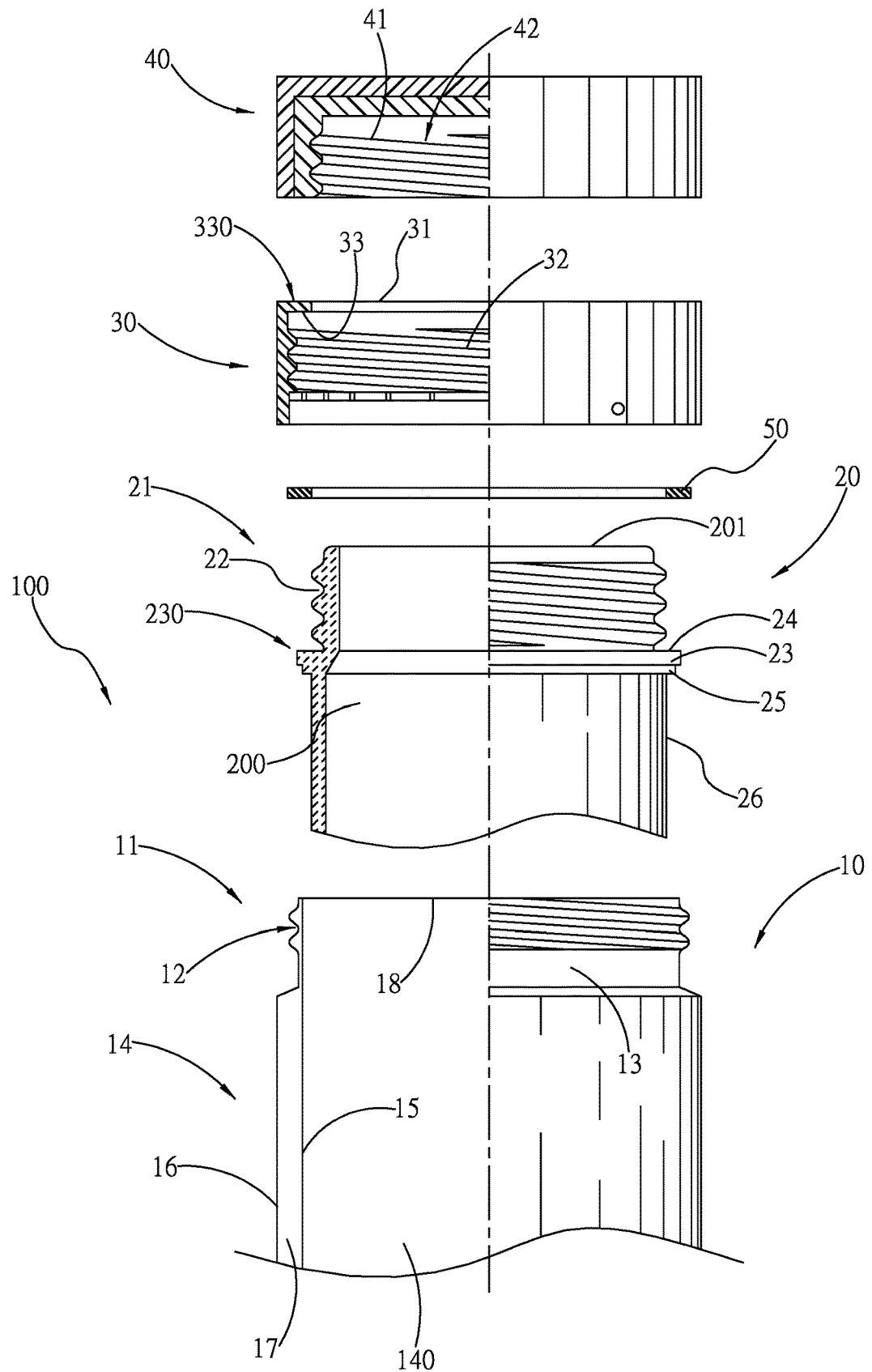
FIG. 1 is an exploded structural view of a drinking container of the present invention.
Figure 2:
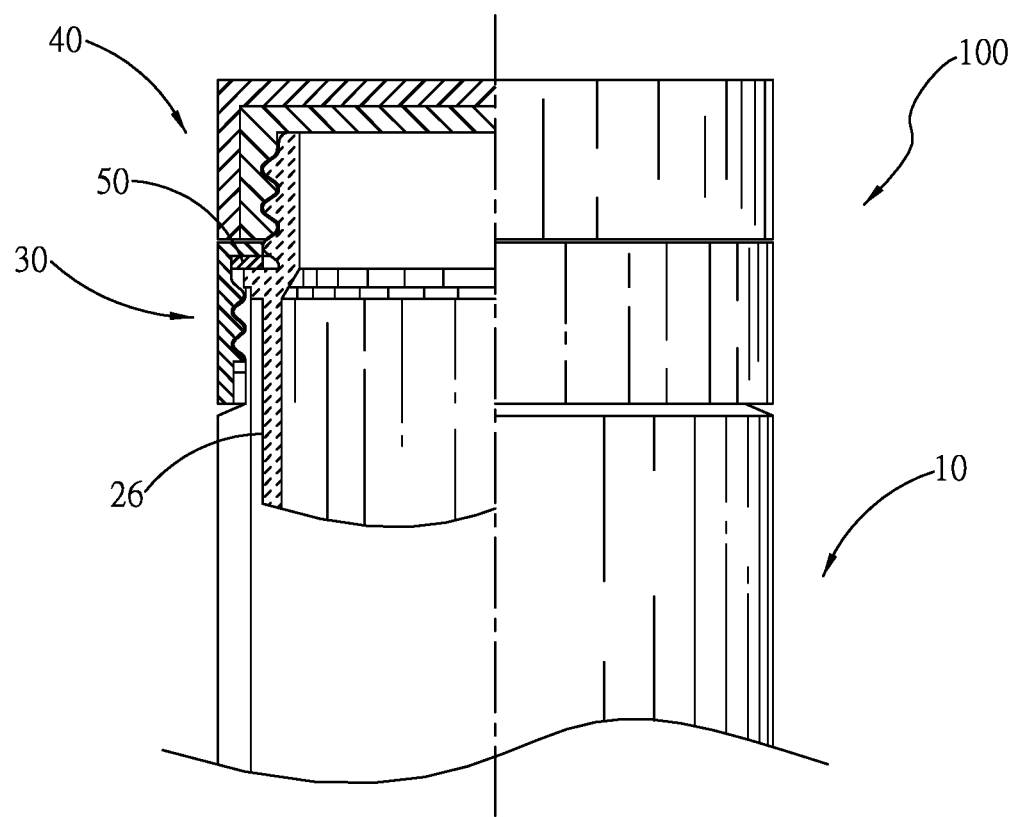
FIG. 2 is a side view of the assembled drinking container of the present invention.

Referring first to FIGS. 1 and 2, which show a drinking container 100 comprising:

An outer cylindrical sleeve 10, the interior of which is a holding space 140, the outer circumference of the upper end of the outer cylindrical sleeve 10 is a connecting end 11, and the upper end of the connecting end 11 is a liner receiving opening 18.

A mineral liner 20, the interior of which is a drink receiving space 200, and an in/out opening 201 of the upper end thereof affords passage to the exterior. A cylinder body 26 of the mineral liner 20 is inserted within the aforementioned holding space 140, and the shoulder portion of the cylinder body 26 is provided with a base pressing portion 230 that joins to the aforementioned liner receiving opening 18.

A connecting ring 30, the upper end surface of which is centrally provided with a through hole 31. The upper inner circumference of the connecting ring 30 is provided with a clasping portion 330 directed towards the through hole 31, and when the clasping portion 330 on the connecting ring 30 is assembled to the connecting end 11, the base pressing portion 230 is thereby securely fixed, enabling stable positioning of the mineral liner 20 within the outer cylindrical sleeve 10. Releasing the clasping portion 330 from the base pressing portion 230 enables disassembling the mineral liner 20.

A cap body 40 at the external end of the entire body is used to seal off an in/out opening 201 of the mineral liner 20.

The holding space 140 of the outer cylindrical sleeve 10 enables the cylinder body 26 of the mineral liner 20 to insert therein. The upper end of the outer cylindrical sleeve 10 is provided with the connecting end 11, while the lower end is a cylinder body 14. The periphery of the connecting end 11 is provided with a helical thread groove 12, and the lower level of the connecting end 11 is provided with a neck portion 13, which is a retracted annular ring of the connected end 11. A cylinder liner 15 of the outer cylindrical sleeve 10 serves as an inner lining, a thermal insulation layer 17 surrounds the outer surface of the cylinder liner 15, and an outer casing 16 envelopes thermal insulation layer 17, thereby forming and providing the outer cylindrical sleeve 10 with heat preservation effectiveness.

The drink receiving space 200 in the interior of the mineral liner 20 can be filled with a beverage. The upper end of the mineral liner 20 is provided with a cap screw thread 22, and the end opening of the mineral liner 20 allows passage in and out of a beverage through the in/out opening 201. The shoulder portion of the mineral liner 20 is provided with the base pressing portion 230, which comprises a shoulder ring 23 with a diameter greater than the liner receiving opening 18 of the holding space 140. The shoulder ring 23 is provided with a holding ring 25 with an external diameter enabling bush assembly with the internal diameter of the liner receiving opening 18. The upper end of the shoulder ring 23 has an annular pressing surface 24. A cap locking end 21 extends coaxially upward from the annular pressing surface 24, and the cap locking end 21 enables locking with a locking portion 41 of the cap body 40.

The through hole 31 provides a central opening at the upper end of the connecting ring 30, and the internal diameter of the through hole 31 can fit over the external diameter of the cap locking end 21. The through hole 31 is indented with the inverse hook shaped annular clasping portion 330, and can be configured with any downward pressing structure in the direction of inner circumferential helical teeth 32 of the connecting ring 30. The inner end surface of the clasping portion 330 of the embodiment is provided with a downward pressing ring surface 33, which butt presses against the aforementioned annular pressing surface 24 of the shoulder ring 23. The lower end surface of a ring shaped elastic washer 50 having elastic deformation and waterproofing qualities downwardly fits tightly on the upper end surface of the annular pressing surface 24. The inner circumference of the connecting ring 30 is provided with the helical teeth 32, which enable locking and joining together with the helical thread groove 12 provided on the connecting end 11 of the outer cylindrical sleeve 10.

Accordingly, when the cylinder body 26 of the mineral liner 20 is inserted into the holding space 140 of the outer cylindrical sleeve 10, the holding ring 25 provided on the base pressing portion 230 is movable inserted in the internal diameter of the liner receiving opening 18, forming a centrally fixed positioning of the mineral liner 20. The through hole 31 of the connecting ring 30 passes over the outer circumference of the cap locking end 21, and the downward pressing ring surface 33 of the clasping portion 330 faces the direction of the annular pressing surface 24, thus enabling the downward pressing ring surface 33 to indirectly press the annular pressing surface 24 through the elastic washer 50. The locking and joining together of the helical teeth 32 with the helical thread groove 12 of the outer cylindrical sleeve 10 is used to cause the downward pressing ring surface 33 to form a downward pressing locking force, which presses the annular pressing surface 24 indirectly through the elastic washer 50, thereby causing the lower end surface of the shoulder ring 23 to press downward on the liner receiving opening 18, achieving assembly of the mineral liner 20 with the outer cylindrical sleeve 10. During the assembly process, the elastic effect of the elastic washer 50 enables locking the angular position of the connecting ring 30 to achieve a larger angular tolerance. In addition, the exposed cap locking end 21 provided on the mineral liner 20 enables locking helical thread 42 provided on the locking portion 41 of the cap body 40 to screw thereon, thereby finally enabling the upper end surface inside the cap body 40 to be locked and joined to the cap screw thread 22 and sealing the in/out opening 201, to achieve sealing of the drink receiving space 200 of the mineral liner 20.

Hence, the downward pressing of the clasping portion 330 on the base pressing portion 230 enables achieving a firm and durable assembly of the entire mineral liner 20 within the outer cylindrical sleeve 10. Disassembling the connecting ring 30 releases the base pressing portion 230 from a lock pressing state, thereby enabling separating the mineral liner 20 from the outer cylindrical sleeve 10 and opening up an operating space to achieve the object of enabling replacing the mineral liner 20.

Figure 3:
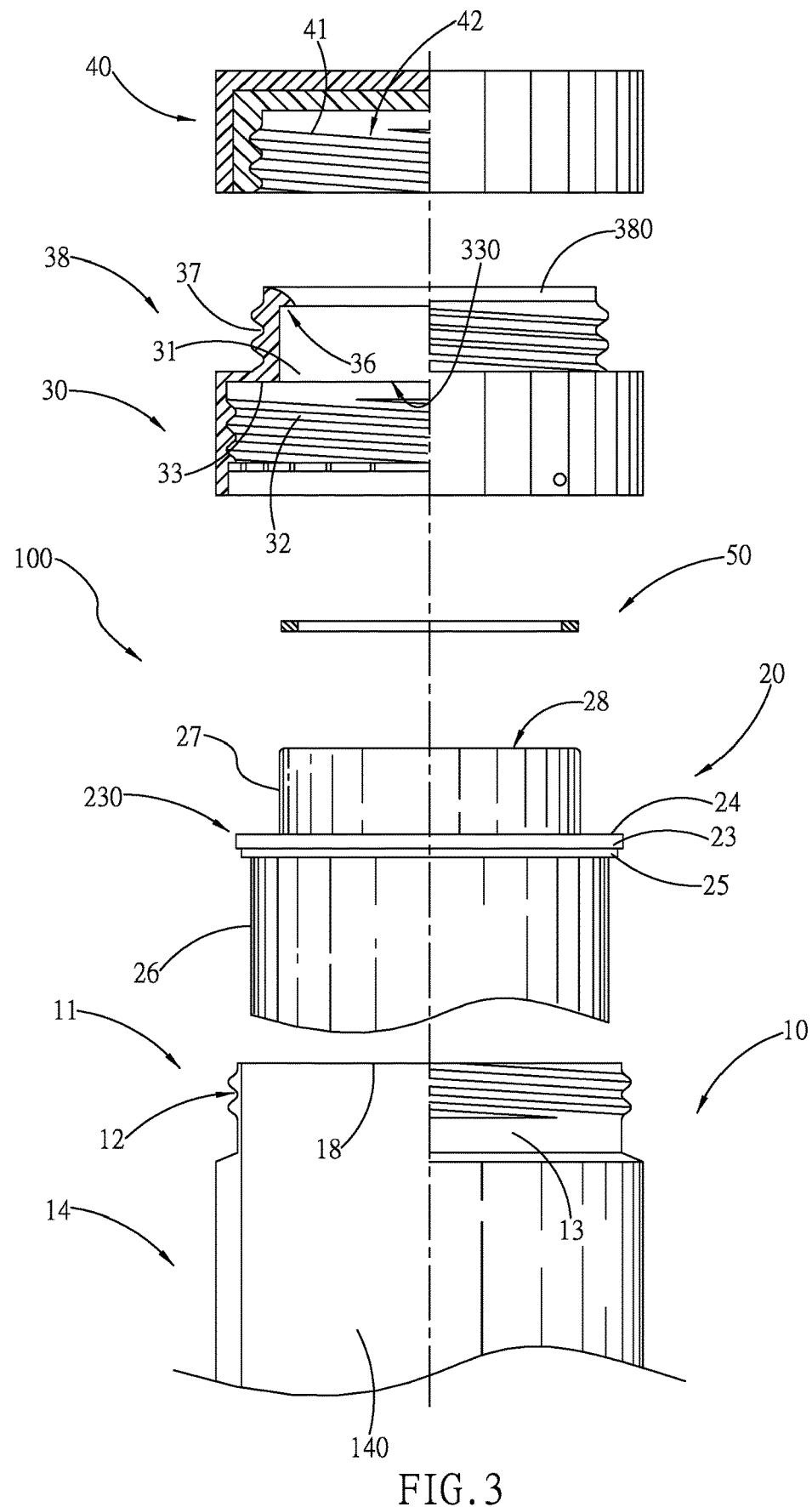
FIG. 3 is a structural relationship view of another embodiment of the drinking container of the present invention.
Figure 4:
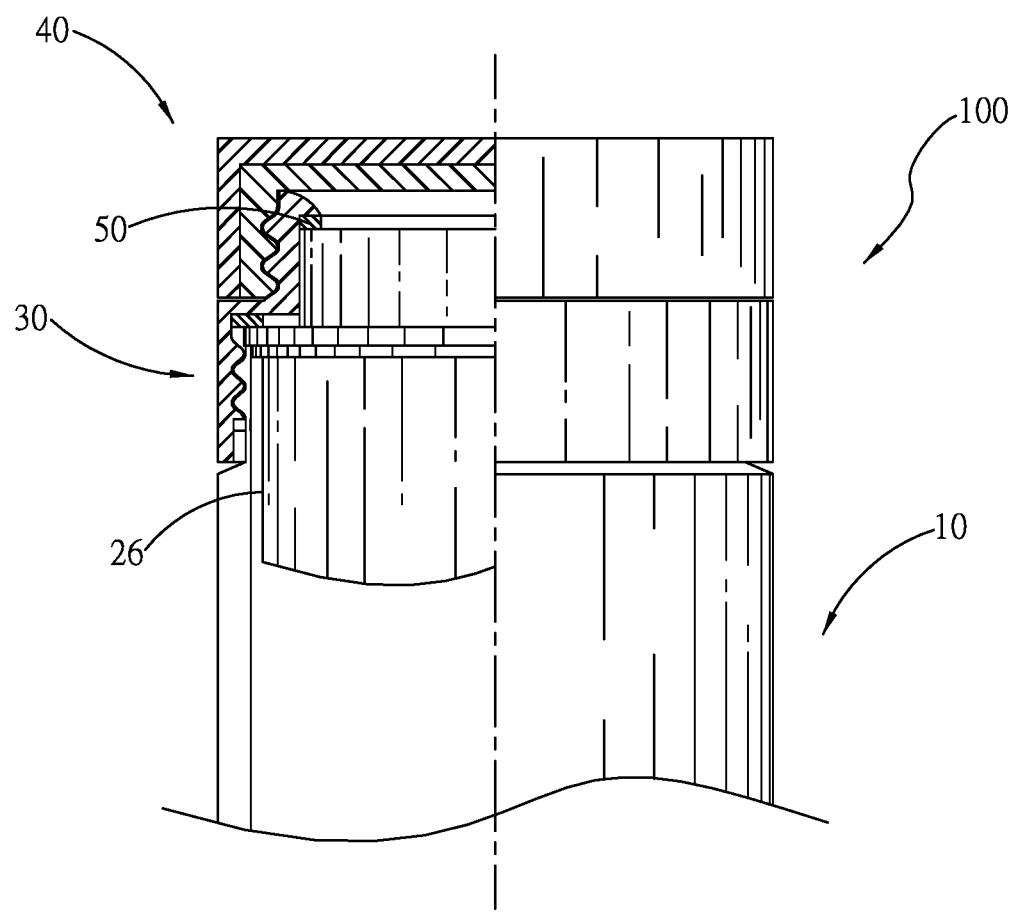
FIG. 4 is an assembled view of FIG. 3.

Referring to FIGS. 3 and 4, which show another embodiment of the present invention, wherein a plane tubular surface 27 with an external diameter smaller than the internal diameter of the aforementioned through hole 31 of the connecting ring 30 coaxially extends upward from the base pressing portion 230 of the mineral liner 20. The upper end of the plane tubular surface 27 is provided with an end opening 28.

The structure of the outer cylindrical sleeve 10 of the present embodiment is identical to that described above, however, there is a change in the design of the mineral liner 20 and the connecting ring 30, wherein the plane tubular surface 27 coaxially extends upward from the upper end of the annular pressing surface 24 of the mineral liner 20. Moreover, the upper end of the plane tubular surface 27 is the end opening 28, and a sealing end 38 coaxially extends upward from the periphery of the through hole 31 of the connecting ring 30. The outer surface of the sealing end 38 is provided with a cap locking portion 37, and the upper end opening of the sealing end 38 is provided with a skin-friendly lip edge 380 for drinking use. The inner circumference of the connecting ring 30 is similarly provided with the clasping portion 330, which is provided with the downward pressing ring surface 33 and the inner circumferential helical teeth 32.

The helical teeth 32 enable locking and joining together with the helical thread groove 12 provided on the connecting end 11 of the outer cylindrical sleeve 10, and the downward pressing ring surface 33 of the clasping portion 330 is used to press the annular pressing surface 24 of the mineral liner 20. The entire base pressing portion 230, through the holding ring 25, enables centrally aligning and inserting the cylinder body 26 into the interior holding space 140 of the outer cylindrical sleeve 10.

The plane tubular surface 27 protrudes and upwardly extends from the mineral liner 20, and the external diameter of the plane tubular surface 27 enables movable pairing with the inner circumferential diameter of the sealing end 38 of the connecting ring 30. The lip edge 380 is provided with a clasping ring surface 36 extending toward the center of the sealing end 38. The inner circumference of the sealing end 38 is movable sleeved on the outer surface of the plane tubular surface 27, and the elastic washer 50, with a diameter equal to that of the plane tubular surface 27, is disposedly mounted between the upper end opening 28 of the plane tubular surface 27 and the clasping ring surface 36, thereby sealing the configuration after assembly thereof.

The outer surface of the sealing end 38 provided with the cap locking portion 37 enables the locking helical thread 42 provided on the locking portion 41 of the cap body 40 to screw and lock thereon, whereby the locking on of cap body 40 finally enables the interior upper end of the cap body 40 to press against the end surface of the lip edge 380, thus achieving sealing effectiveness.

Figure 5:
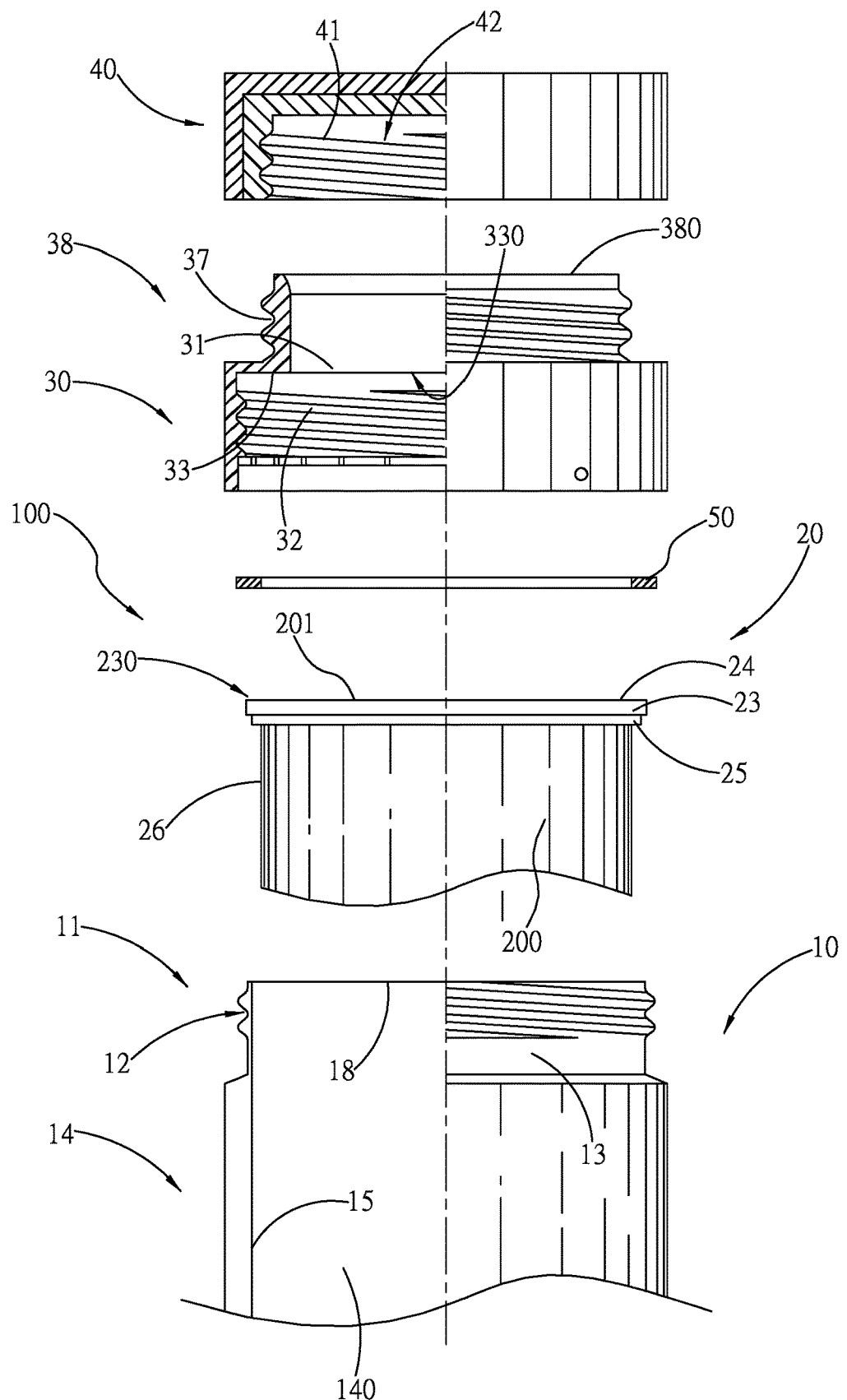
FIG. 5 is a structural schematic view of another embodiment of the drinking container of the present invention.
Figure 6:
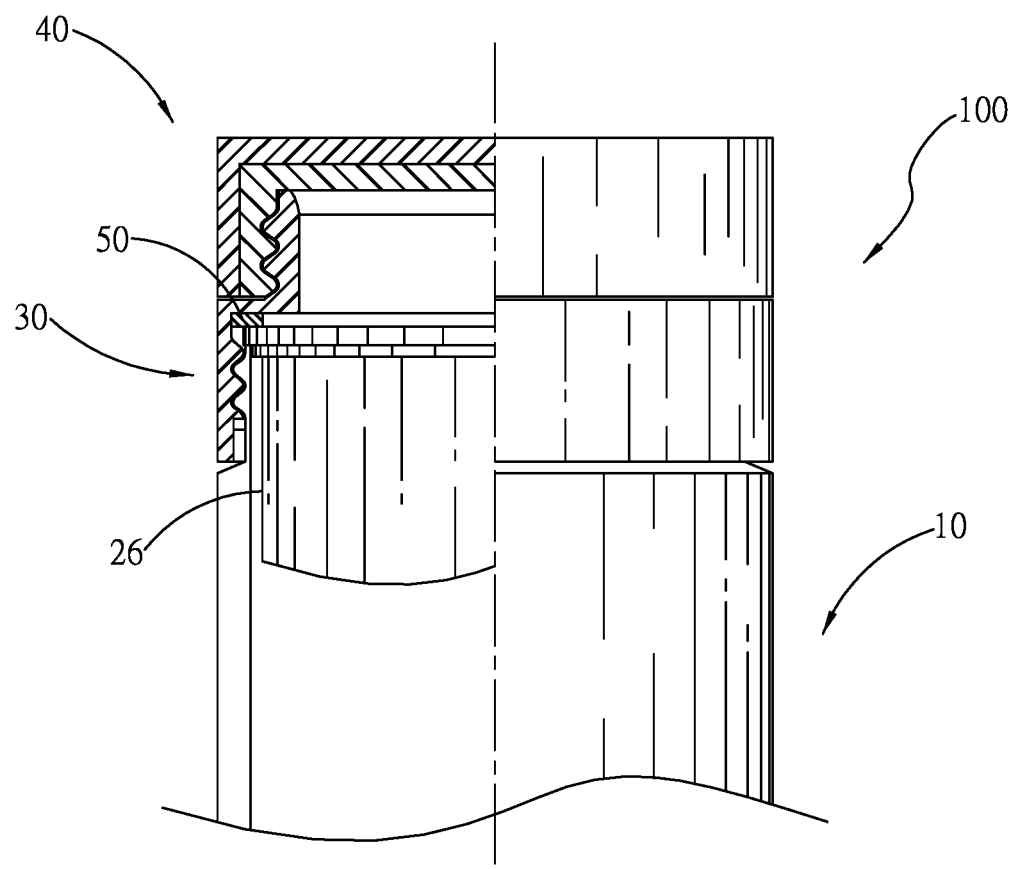
FIG. 6 is an assembled view of FIG. 5.

Referring to FIGS. 5 and 6, which show another embodiment of the present invention, wherein the connecting ring 30 is provided with the through hole 31, and the through hole 31 is provided with the annular clasping portion 330 extending inward toward the center of the through hole 31. The sealing end 38 coaxially extends upward from the through hole 31, and the outer end of the sealing end 38 is provided with the lip edge 380. In addition, the base pressing portion 230 of the mineral liner 20 is provided with the annular pressing surface 24, and the center of the top surface thereof is centrally opened with the in/out opening 201 toward the interior holding space 140 of the mineral liner 20. The in/out opening 201 outwardly joins with the lip edge 380 through the inner circumference of the sealing end 38.

The structure of the outer cylindrical sleeve 10 of the present embodiment is identical to that described above, what's particular is that the top plane surface of the annular pressing surface 24 of the shoulder ring 23 at the top end of the mineral liner 20 provided with the in/out opening 201 enables filling the drink receiving space 200 with drinks. After completing assembly, the in/out opening 201 provides passage to the aforementioned lip edge 380 through the inner circumference surface of the sealing end 38. The connecting ring 30 is similarly provided with the downward pressing ring surface 33 at the position of the clasping portion 330. The downward pressing ring surface 33 presses the annular pressing surface 24 of the shoulder ring 23 through the elastic washer 50 diametrical pressing the annular pressing surface 24 on the top end of the shoulder ring 23. The thread locking force of the helical teeth 32 with the helical thread groove 12 of the outer cylindrical sleeve 10 is used to connectively press the downward pressing ring surface 33 against the annular pressing surface 24 of the shoulder ring 23 through the elastic washer 50. The combined structure similarly uses the movable pairing of the holding ring 25 with the liner receiving opening 18, accordingly, guiding the center line of the mineral liner 20 to align with and overlap with the center of the outer cylindrical sleeve 10. Hence, a drink entering and leaving the drink receiving space 200 of the mineral liner 20 is guided through the lip edge 380 on the upper end of the inner circumference of the sealing end 38 extending upward from the through hole 31. The outer surface of the sealing end 38 is provided with the cap locking portion 37, which locks and joins with the locking helical thread 42 of the locking portion 41 inside the cap body 40, which results in the locking and joining enabling the upper end of the inner surface of the cap body 40 to press against the lip edge 380, thereby achieving the object of sealing the internal space of the mineral liner 20.

Figure 7:
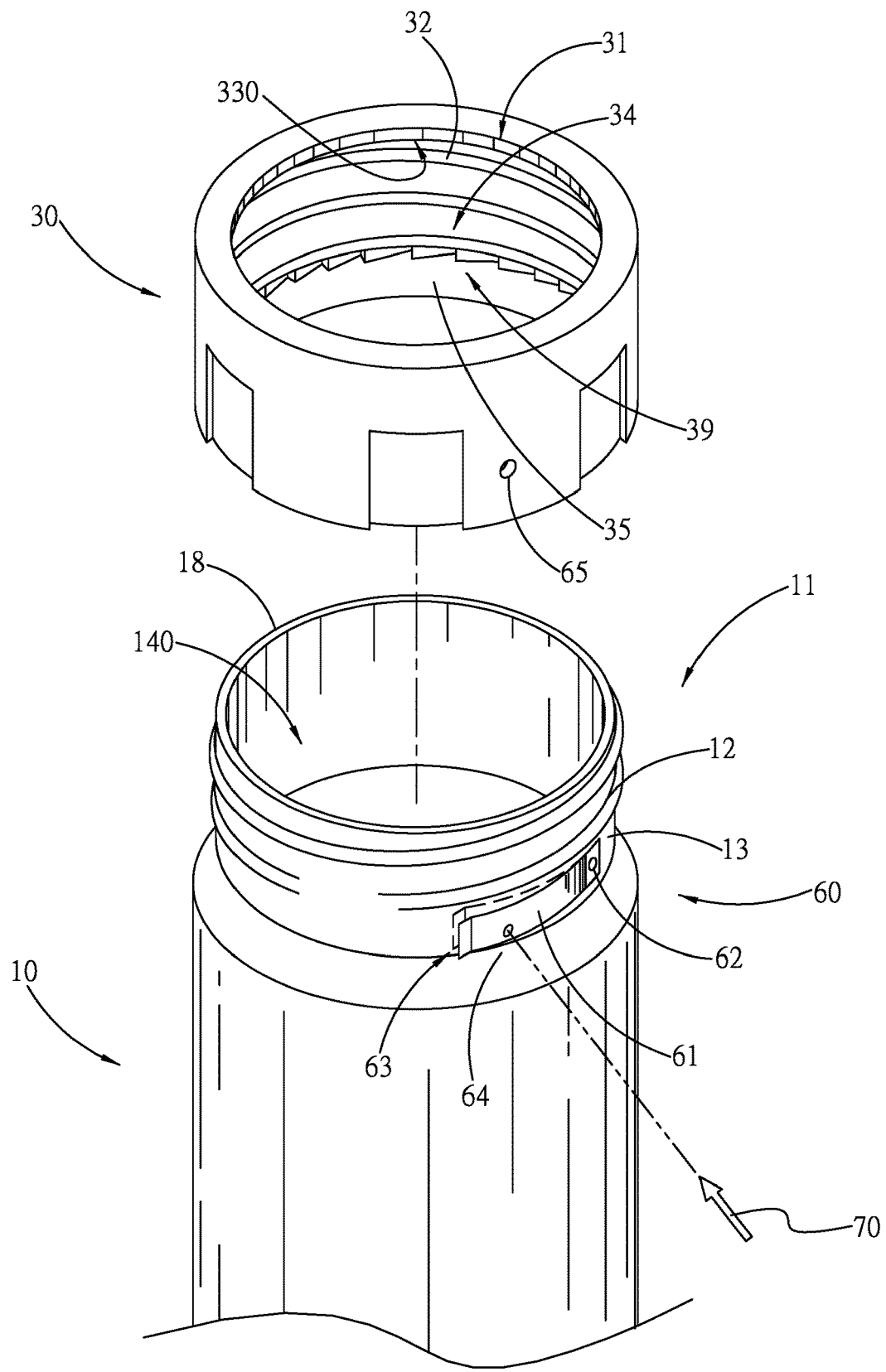
FIG. 7 is a structural schematic view depicting a locking device of the present invention.
Figure 8:
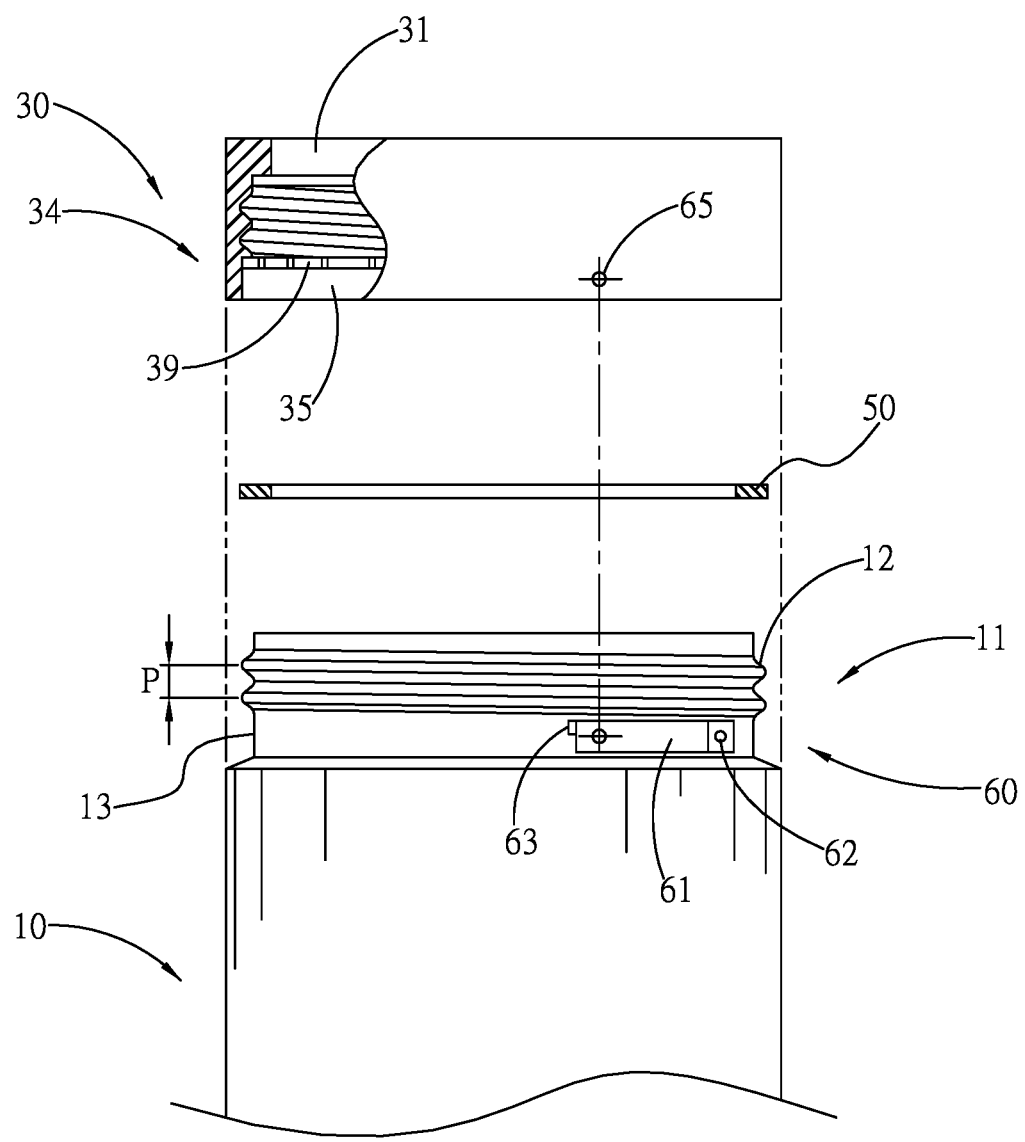
FIG. 8 is a side view of FIG. 7.

Referring to FIGS. 7 and 8 (together with reference to FIG. 1), which show a locking device 60 for the mineral liner 20, which enables locking the mineral liner 20 to prevent loosening thereof and releasing the locking device 60 enables replacing the mineral liner 20 after disassembling thereof. The shoulder portion of the cylinder body 26 of the mineral liner 20 is radially provided with the base pressing portion 230, and the outer end opening of the base pressing portion 230 is provided with the in/out opening 201 that affords passage to the interior of the drink receiving space 200. The upper end of the outer cylindrical sleeve 10 is provided with the neck portion 13 at the lower end of the connecting end 11, and an elastic clasp 61 is joined to the flat surface of the outer circumference neck portion 13. The connecting ring 30 is joined to the upper end of the outer cylindrical sleeve 10, and the lower end of the inner circumference of the connecting ring 30 is radial annular provided with a locking ring member 34. After the cylinder body 26 of the mineral liner 20 is inserted into the interior of the outer cylindrical sleeve 10 and the connecting ring 30 joined thereon, the pressing down of the connecting ring 30 securely clasps and joins the mineral liner 20 inside the outer cylindrical sleeve 10. Operation of the locking device 60 causes the locking ring member 34 provided on the connecting ring 30 to be subjected to single-point clasping of the elastic clasp 61.

The locking device 60 is provided with the elastic strip-shaped elastic clasp 61 positionally joined to the neck portion 13 of the outer cylindrical sleeve 10. The lower end of the inner circumference of the connecting ring 30 is radial annular provided with the locking ring member 34, and when the connecting ring 30 is rotated until completely locked with the connecting end 11, then inner spiked annular teeth 39 provided on the locking ring member 34 are subjected to single-point clasping of the elastic clasp 61, which prevents reverse rotation of the connecting ring 30, thereby achieving the locking objective.

One end of the elastic clasp 61 is securely fixed to the outer surface of the neck portion 13 using a fixing portion 62, and the other end of the elastic clasp 61 is a free end. The free end is provided with a detent 63 having a clasping function, and the outer surface of the elastic clasp 61 adjacent to the position of the detent 63 is defined as a press point 64. The press point 64 can receive the pressing of a puncture tool 70, which connectively causes elastic deformation of the elastic clasp 61 and bending thereof toward the outer surface of the neck portion 13. In a normal state, the elastic clasp 61 uses its elasticity to cause the detent 63 to arch radially outwards. The elastic clasp 61 is a long strip positionally arranged along the circumferential direction of the neck portion 13.

The interior of the outer cylindrical sleeve 10 provides the holding space 140, and the upper end of the outer cylindrical sleeve 10 is the liner receiving opening 18. The structural portion of the locking device 60 is arranged to align with the locking ring member 34 at the lower end of the inner circumference of the connecting ring 30. The locking ring member 34 of the present embodiment is provided with the inner spiked annular teeth 39, the lower end of which is a flat inner circumference 35. The helical teeth 32 provided on the inner circumference of the connecting ring 30 lock and join with the helical thread groove 12 of the connecting end 11 to achieve a tight fit, and the detent 63 is able to locate one of the inner spiked annular teeth 39 corresponding thereto and clasp therewith.

Figure 9:
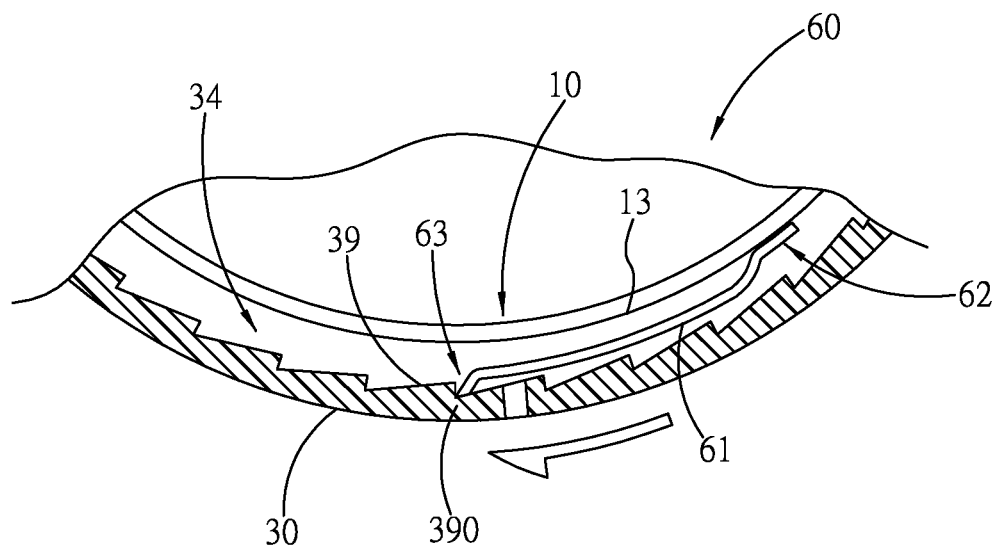
FIG. 9 is a top view depicting the clasping operation of the locking device according to the present invention.
Figure 10:
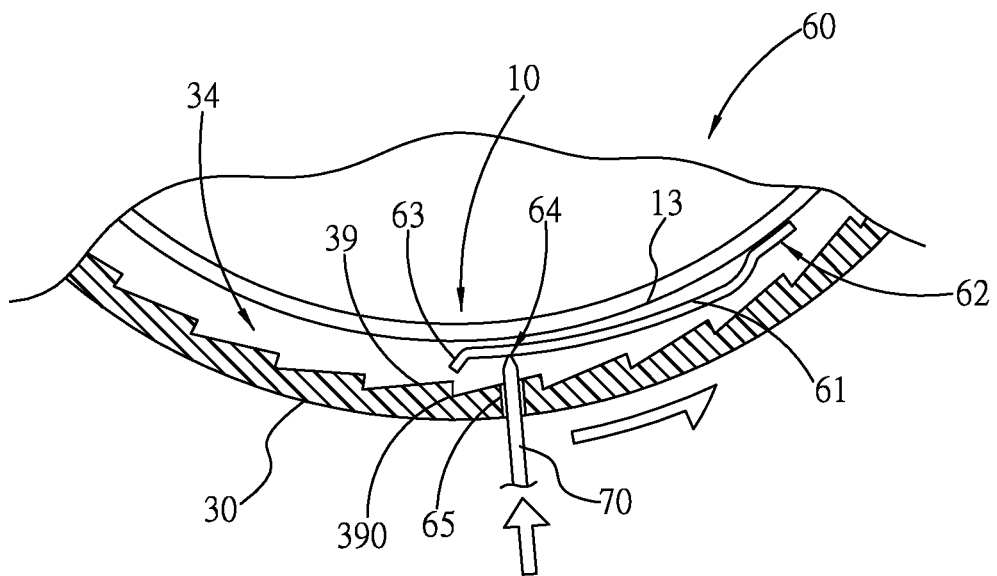
FIG. 10 is a first top view depicting the clasping operation of the locking device according to the present invention.

Referring to FIGS. 9 and 10, which depict overhead views of the locking ring member 34 inside the connecting ring 30 with identical orientated inner spiked annular teeth 39. The long strip-shaped elastic clasp 61 is positionally arranged on the radial surface of the neck portion 13 of the outer cylindrical sleeve 10, and the fixed end of the elastic clasp 61 is securely fixed to the outer surface of the neck portion 13 using the fixing portion 62. The elastic clasp 61 is an elastic arched body, which in a static state produces an elastic force that causes the elastic clasp 61 to spring out in a radial peripheral direction that causes the detent 63 at the free end to arch outward, thereby achieving positioning thereof corresponding to the appropriate inner spiked annular teeth 39. The detent 63 is restrained within one of a plurality of clasp grooves 390 of the inner spiked annular teeth 39. A precondition for this restraining action is that the outer cylindrical sleeve 10 is fixed as a result of rotating the connecting ring 30 in a clockwise direction.

After completing the above-described locking action, the angular position of the connecting ring 30 must allow the clasp grooves 390 to accept the clasping angle presented by the detent 63, and angular modification thereof corresponds to the clearance range of each of the inner spiked annular teeth 39. Tolerance condition of the modified angle is the amount of change in thickness of the aforementioned elastic washer 50 (as shown in FIG. 8) can compensate from pressing.

Referring to FIG. 10, before disassembling the connecting ring 30, first, hand force is applied to the puncture tool 70 to press down on the press point 64 to overcome the elasticity of the elastic clasp 61, which causes the detent 63 to disengage from the clasp groove 390 of the inner spiked annular teeth 39, after which, the connecting ring 30 is rotated in an anticlockwise direction.

Figure 11:
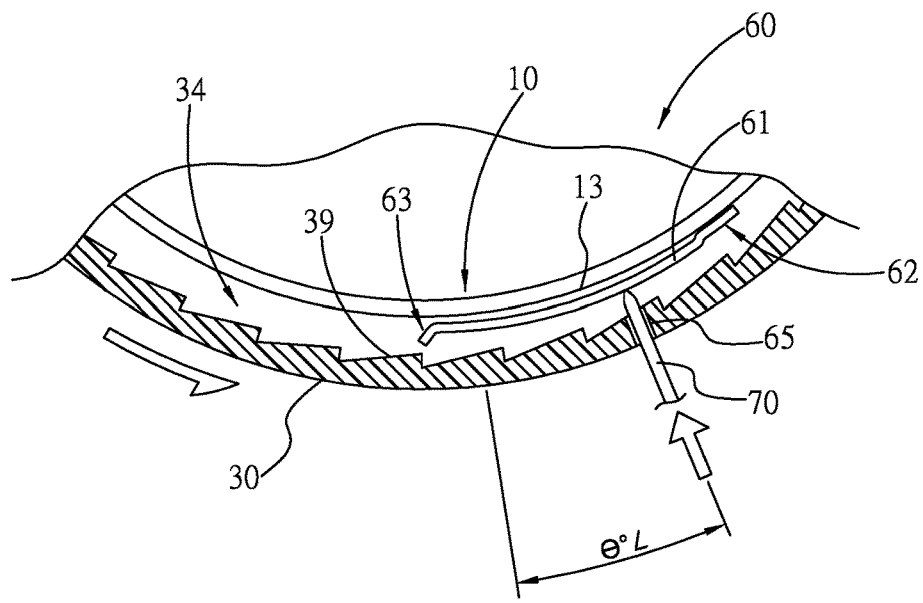
FIG. 11 is a second top view depicting the clasping operation of the locking device according to the present invention.

Referring to FIG. 11, which shows the puncture tool 70 penetrating a pinhole 65 and pressing the outer surface of the elastic clasp 61, and during the process of rotating the connecting ring 30 anticlockwise, the puncture tool 70 is contained by the pinhole 65 and displaced in the direction of the fixing portion 62 of the elastic clasp 61. During the displacement process, the surface width of the elastic clasp 61 is sufficient to enable obliquely drawing the puncture tool 70 along the elastic clasp 61, and also allows the puncture tool 70 to maintain pressing the outer surface of the elastic clasp 61, which deactuates the detent 63 from interfering with the inner spiked annular teeth 39, thus enabling the connecting ring 30 to smoothly unscrew. The state of the elastic clasp 61 is fixed along with the outer cylindrical sleeve 10 and maintains its original position while front and rear displacement of the puncture tool 70 changes by one angle. The pinhole 65 can also be a long groove shape, wherein the length of the groove is used to prevent obstruction when withdrawing the puncture tool 70.

Referring to FIG. 8. which shows the elastic clasp 61 as a long strip shape positionally arranged on the radial circumferential surface of the neck portion 13 of the outer cylindrical sleeve 10; the detent 63 clasps onto the inner spiked annular teeth 39 of the connecting ring 30, and rotating the connecting ring 30 through an unlocking rotation angle disengages the lower edge of the height breadth of the inner spiked annular teeth 39 from the upper edge of the detent 63. A spacing P of the helical thread groove 12 provided on the connecting end 11 must be greater than the height of the inner spiked annular teeth 39, however, because the angle based on the present embodiment is at least fivefold greater than this. Thus, when the connecting ring 30 is rotated in an anticlockwise direction, about one fifth a rotation causes the inner spiked annular teeth 39 to disengage from the upper edge of the detent 63. The arranged height position of the elastic clasp 61 is a reference point for the position of the connecting ring 30 prior to locking onto the connecting end 11. The reference point is a reference for when the connecting ring 30 locking onto the connecting end 11 achieves the tightest fit. The area of the height position of the upper side of the locking ring member 34 corresponds to the height position on the upper edge of the detent 63 provided on the elastic clasp 61.

Figure 12:
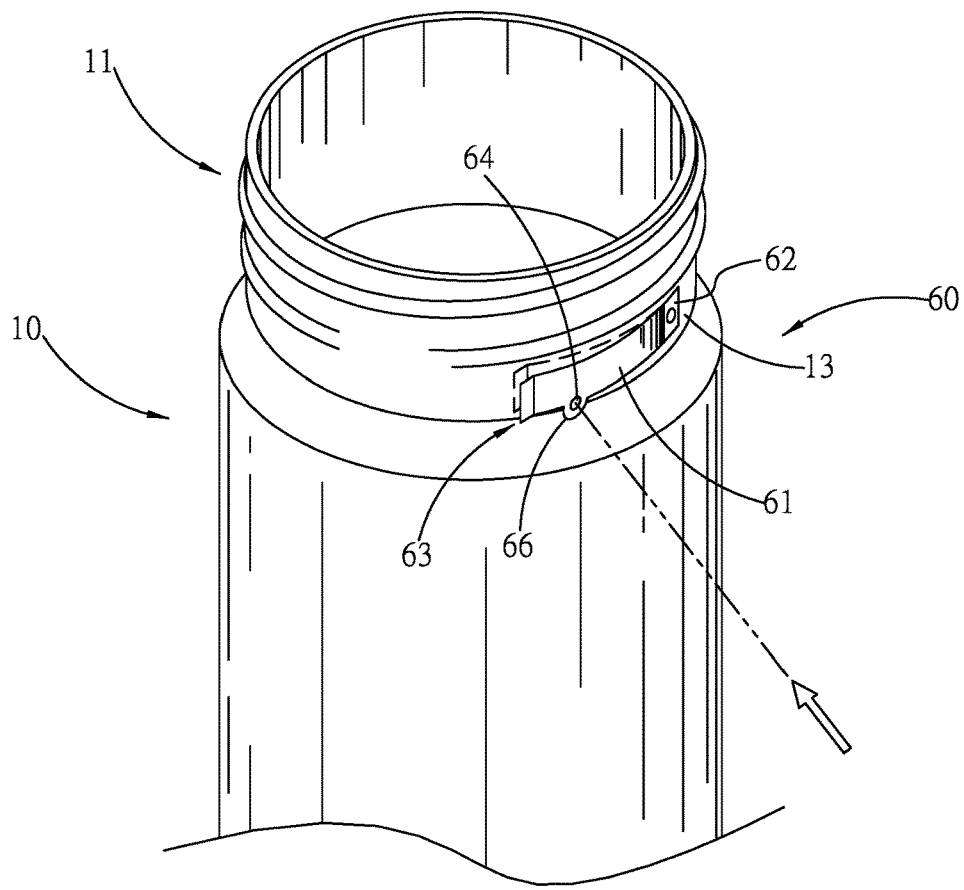
FIG. 12 is a three-dimensional schematic view of another embodiment of the locking device of the present invention.

Referring to FIG. 12, which shows another embodiment of the elastic clasp 61 of the locking device 60, wherein a lower extending piece 66 extends downward from the lower edge of the free end on one side of the detent 63 of the elastic clasp 61. The interior breadth of the lower extending piece 66 is defined for use as the press point 64, and the elastic clasp 61 is similarly provided with an elastic holding function. The detent 63 in a static state effects an outward arched elastic force, and when the downward lower extending piece 66 is subjected to an external force effect, the elastic clasp 61 is similarly actuated and presses close to the outer surface of the neck portion 13.

Figure 13:
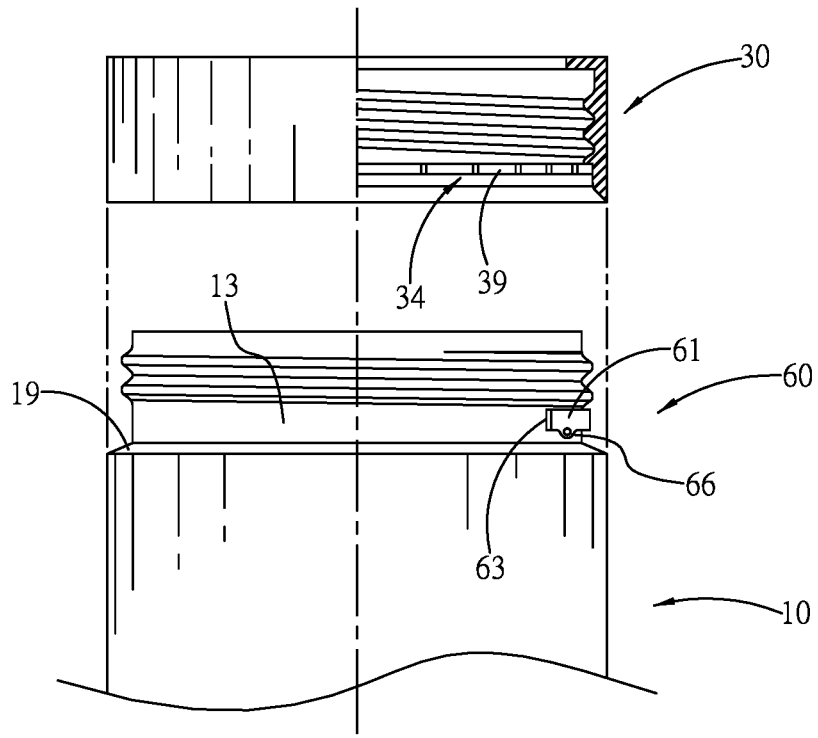
FIG. 13 is a side view of the other embodiment of the locking device of the present invention.
Figure 14:
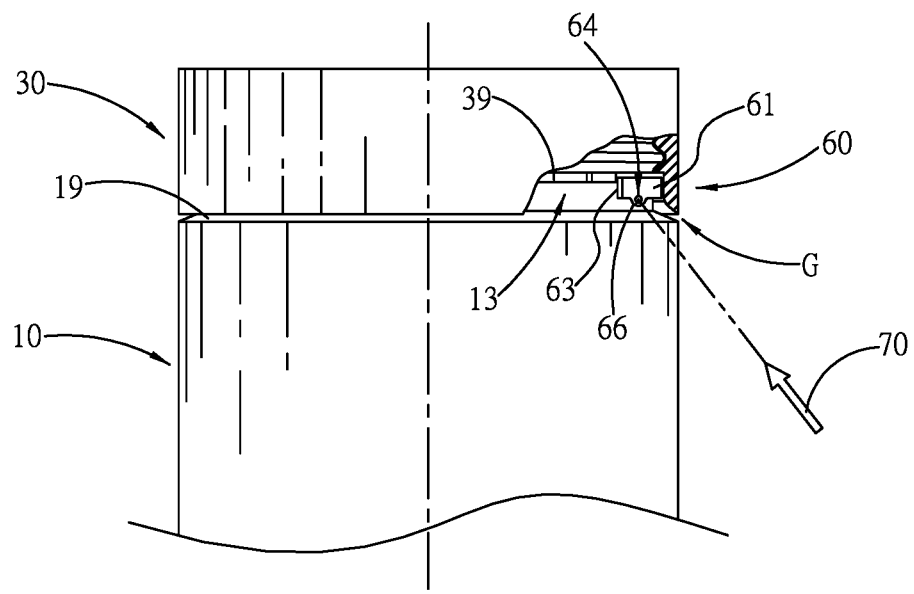
FIG. 14 is a schematic view depicting the unlocking path of the other embodiment of the locking device of the present invention.

Referring to FIGS. 13 and 14. which show the outer cylindrical sleeve 10 rotated making the detent 63 of the locking device 60 to appear close to the right side of the drawings, and it is easy to interpret that the lower extending piece 66 provides a release operation. As shown in the diagrams, the neck portion 13 of the outer cylindrical sleeve 10 enables assembling the elastic clasp 61 thereon, and the lower extending piece 66 extends downward from the detent 63. The lower extending piece 66 is close to the position of a tightening ring surface 19 of the outer cylindrical sleeve 10. During assembly, a clearance G is reserved between the tightening ring surface 19 and the lower end opening of the connecting ring 30, and the strip shaped puncture tool 70 is used to insert into the clearance G to reach the position with the lower extending piece 66 aligned with the press point 64 for oblique pressing thereof, which similarly presses the elastic clasp 61 down toward the neck portion 13, thus causing the detent 63 to disengage and unlock the inner spiked annular teeth 39 from the locking ring member 34 to achieve unclasping of the connecting ring 30.

The elastic clasp 61 fixes the outer cylindrical sleeve 10, and during operation, the connecting ring 30 is rotated in an anticlockwise direction, during which the puncture tool 70 extends into and continually presses the lower extending piece 66 through the clearance G, thus enabling the detent 63 to interconnect with the lower extending piece 66 to maintain pressure toward the neck portion 13. Accordingly, rotation of the connecting ring 30 will not cause interference with the puncture tool 70.

The above-described clearance G is a tiny clearance or can even be an oblique channel, which makes it difficult to visually notice the existence of the elastic clasp 61, thus maintaining exterior aesthetics while freeing up a tool for easy operation thereof. Hence, the puncture tool 70 can have a strip shape, rod shape, needle shape, or a rhombic cross section, which enable the puncture tool 70 to pass through the tiny clearance G and inwardly contact the elastic clasp 61.

In the assemble and disassemble relationship between the connecting ring 30 and the outer cylindrical sleeve 10 of the present invention, the locking device 60 exemplified in the structural embodiments shown in FIGS. 1 to 6 provides convenient assemble and disassemble of the mineral liner 20 or the locking operation thereof.

The configuration of the locking device 60 is disclosed in the drawings depicted in FIGS. 1 to 6, wherein the neck portion 13 of the connecting end 11 and the inner circumferential lower end of the connecting ring 30 assist in obtaining a secure combining angular clasping between the outer cylindrical sleeve 10 and the connecting ring 30, effectively maintaining fixed positioning of the mineral liner 20 after assembly. After unclasping, the connecting ring 30 can be disengaged from the outer cylindrical sleeve 10, yielding an operating space that allows replacement of the mineral liner 20.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A locking device for a container liner, which enables locking a liner to prevent loosening after assembling thereof, and releasing the locking device enables replacing the liner, comprising:
   a mineral liner, a cylinder body of the mineral liner is radially provided with a base pressing portion, an upper end of the base pressing portion is provided with an in or out opening that affords passage to an interior of a drink receiving space;
   an outer cylindrical sleeve, an upper end of which is provided with a connecting end, a lower level of the connecting end is provided with a neck portion, and an elastic clasp is joined to an outer circumference of the neck portion;
   a connecting ring, an upper end of which is centrally provided with a through hole, the connecting ring is joined to the upper end of the base pressing portion, a lower end of an inner circumference of the connecting ring is radial annular provided with a locking ring member, the elastic clasp joined to the neck portion together with the connecting ring effects a mutual clasping operation;
   after the cylinder body of the mineral liner is inserted into an interior of the outer cylindrical sleeve and the connecting ring joined thereon, the pressing down of the connecting ring securely holds and joins the mineral liner inside the outer cylindrical sleeve, at which time, the locking ring member of the connecting ring is subjected to single-point clasping by the elastic clasp.

2. The locking device for the container liner according to claim 1, wherein the locking ring member comprises inner spiked annular teeth.

3. The locking device for the container liner according to claim 1, wherein the elastic clasp is a long strip shape, one end of which is fixed to the neck portion of the connecting end, the longitudinal body of the elastic clasp is radially parallel to the neck portion, a free end of the elastic clasp is provided with a detent that elastically arches outward, the outer surface of the elastic clasp close to the detent is defined as a press point, which through an external force enables adjusting the detent to press against the outer surface of the neck portion, thereby disengaging the locking function of the locking ring member.

4. The locking device for the container liner according to claim 3, wherein the press point is accessible from outside through a pinhole provided in the connecting ring.

5. The locking device for the container liner according to claim 4, wherein the pinhole is a long groove shape.

6. The locking device for the container liner according to claim 1, wherein the inner circumference of the connecting ring provides an assembling and disassembling function using a screwing locking method.

7. The locking device for the container liner according to claim 1, wherein the connecting end is provided with a helical thread groove, the height of inner spiked annular teeth provided on the locking ring member of the connecting ring is smaller than the spacing of the helical thread groove.

8. The locking device for the container liner according to claim 1, wherein a lower extending piece extends downward from the lower edge of the free end on one side of the detent of the elastic clasp, the outer surface of the lower extending piece is defined as a press point, the press point is accessible from outside through the assembling clearance between the lower end of the connecting ring and the outer surface of the neck portion.

* * * * *